United States Patent
Saunders

(10) Patent No.: US 7,079,764 B2
(45) Date of Patent: Jul. 18, 2006

(54) FAULT ISOLATION TECHNIQUE FOR OPTICAL NETWORKS

(76) Inventor: Ross Saunders, 36-110 Havelock Street, Ottawa, Ontario (CA) K1S 5L3

(*) Notice: Subject to any disclaimer, the term of this patent is extended or adjusted under 35 U.S.C. 154(b) by 549 days.

(21) Appl. No.: 09/940,139

(22) Filed: Aug. 27, 2001

(65) Prior Publication Data

US 2003/0041279 A1    Feb. 27, 2003

(51) Int. Cl.
*H04B 10/00*    (2006.01)
(52) U.S. Cl. .......................... 398/10; 398/17
(58) Field of Classification Search ............... 398/9–38
See application file for complete search history.

(56) References Cited

U.S. PATENT DOCUMENTS

| | | |
|---|---|---|
| 5,513,029 A | 4/1996 | Roberts |
| 5,745,274 A | 4/1998 | Fatehi et al. |
| 5,801,863 A | 9/1998 | Fatehi et al. |
| 5,892,606 A | 4/1999 | Fatehi et al. |
| 5,963,312 A * | 10/1999 | Roberts ...................... 356/73.1 |
| 6,005,694 A | 12/1999 | Liu |
| 6,075,628 A | 6/2000 | Fisher et al. |
| 6,134,032 A | 10/2000 | Kram et al. |
| 6,215,565 B1 | 4/2001 | Davis et al. |
| 6,317,231 B1 | 11/2001 | Al-Salameh et al. |
| 6,742,154 B1 * | 5/2004 | Barnard ...................... 714/752 |
| 6,744,992 B1 * | 6/2004 | Bergano ...................... 398/183 |

FOREIGN PATENT DOCUMENTS

FR    0580316 A1 *    1/1994

* cited by examiner

*Primary Examiner*—Agustin Bello

(57) ABSTRACT

A method is provided for isolating faults in an optical network having a plurality of partial regenerators. The method includes: transmitting an optical signal through the optical network; determining an error rate for the optical signal at an egress point of the optical network; sequentially introducing a dither control signal into the optical signal at each of the plurality of partial regenerators; and monitoring the error rate for the optical signal at the egress point of the optical network; thereby isolating where a fault occurs in the optical network.

12 Claims, 4 Drawing Sheets

FAULT ISOLATION TECHNIQUE FOR OPTICAL NETWORKS

FIELD OF THE INVENTION

The present invention relates generally to a fault isolation technique for optical networks and, more particularly, to a method for isolating faults by selectively introducing a dither control signal into the optical signal traversing through an optical network.

BACKGROUND OF THE INVENTION

Fault isolation is an essential network management function for optical transport networks. Optical transport networks typically employ numerous regenerators to remove noise and distortion from the signals propagating through optical networks. Regenerators may also perform signal error checking that enables sectionalization of errors in optical networks. In this scenario, faults may be isolated by checking error detection data embedded in the optical signals at each of the regenerators residing in an optical network.

However, optical transport networks are beginning to employ partial regenerators that do not perform signal error checking. Partial regenerators offer a smaller footprint and less power consumption at a lower cost than conventional regenerators, thereby resulting in an overall network cost reduction. Nevertheless, if there is a signal degradation in the network, it is still important to be able to isolate the fault within the network.

Therefore, it is desirable to provide a method for isolating faults in an optical network employing partial regenerators.

SUMMARY OF THE INVENTION

In accordance with the present invention, a method is provided for isolating faults in an optical network having a plurality of partial regenerators. The method includes: transmitting an optical signal through the optical network; determining an error rate for the optical signal at an egress point of the optical network; sequentially introducing a dither control signal into the optical signal at each of the plurality of partial regenerators; and monitoring the error rate for the optical signal at the egress point of the optical network; thereby isolating where a fault occurs in the optical network.

For a more complete understanding of the invention, its objects and advantages, reference may be had to the following specification and to the accompanying drawings.

DETAILED DESCRIPTION OF THE PREFERRED EMBODIMENTS

Figure 1:
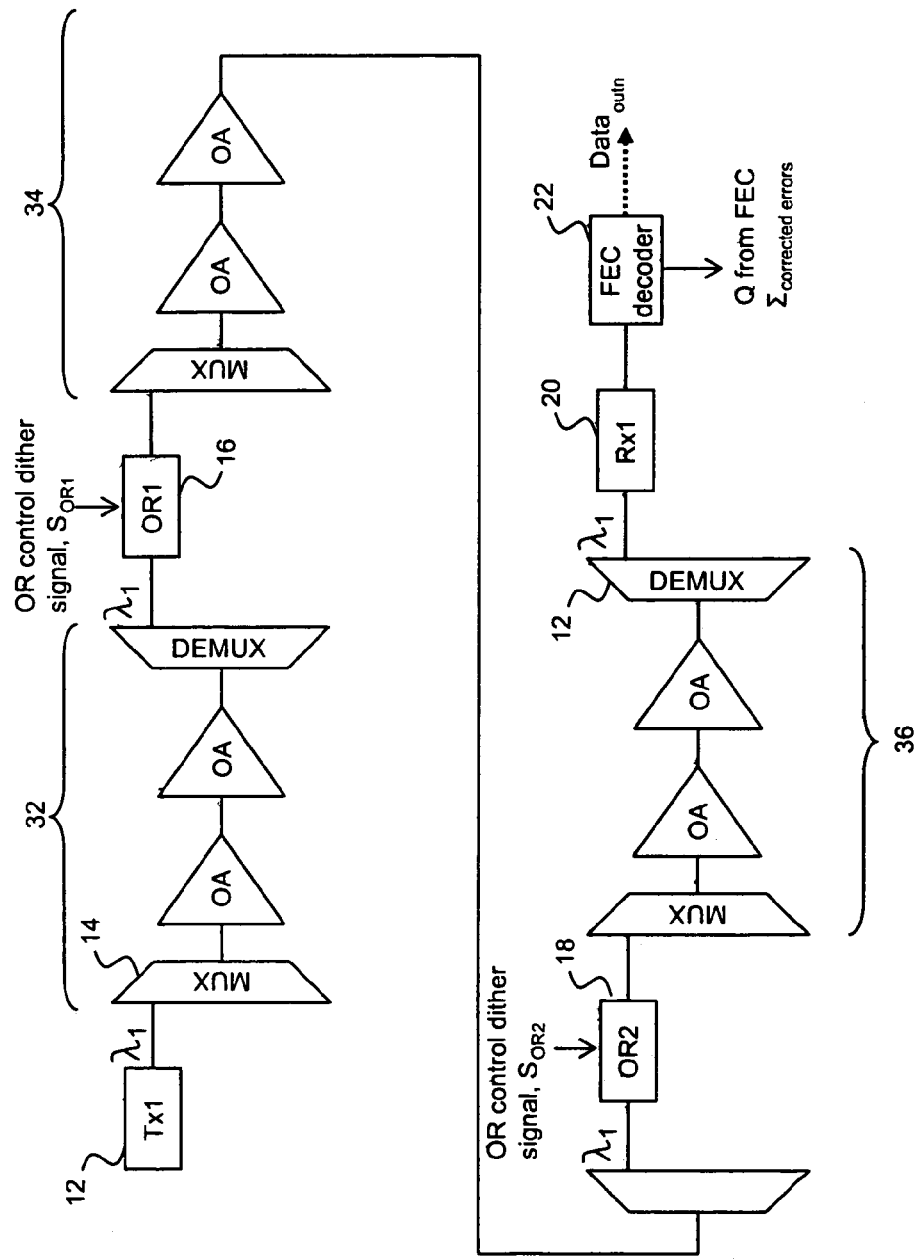
FIG. 1 is a block diagram depicting an exemplary optical transport network having a plurality of partial regenerators in accordance with the present invention.

FIG. 1 depicts an exemplary optical transport network 10 having a plurality of partial regenerators. For illustration purposes, a single channel is shown traversing the optical network 10. A first transmitter 12 may be used to launch the signal channel into the network. It is to be understood that a plurality of signal channels may be supported by the optical network. Thus, the first transmitter 12 is optically connected to a first multiplexer 14. The first multiplexer 14 is operable to combine a plurality of signal channels at different wavelengths into an optical data signal.

The optical data signal can be expected to traverse several regenerators as it propagates through the optical network 10. In this example, the optical network 10 includes a first optical regenerator 16 and a second optical regenerator 18. Although optical regenerators are presently preferred, this is not intended as a limitation of the broader aspects of the present invention. On the contrary, it is envisioned that any partial regenerator that is unable to perform signal error checking is within the scope of the present invention.

A first receiver 20, in conjunction with an error decoder 22, serves as an egress point for the signal channel. Prior to the receiver 20, a demultiplexer 24 separates the optical data signal into individual signal channels, including the signal channel received by the receiver 20. The first receiver 20 then converts the optical (channel) signal into an electrical data signal which may in turn be decoded by the error decoder 22. As will be apparent to one skilled in the art, various other optical components may be interposed between the transmitter 12 and the receiver 20.

A fault may occur at any point along the optical network path. To isolate a fault, the network path may be logically divided into different network sections. For illustration purposes, the optical network 10 described above may be divided into three network sections. A first network section 32 is defined as the network path between the transmitter 12 and the first optical regenerator 16. A second network section 34 is defined as the network path between the first optical regenerator and the second optical regenerator 18. A third network section 36 is defined as the network path between the second optical regenerator 18 and the receiver 20.

In accordance with the present invention, a method is provided for isolating faults in an optical network having a plurality of partial regenerators. Briefly, a baseline error rate is determined for an optical signal traversing through the optical network. The error rate may be derived from error detection data embedded in the optical signal as is well known in the art. For example, error detection data may be embedded in the B1 byte of a data frame in accordance with the SONET communication protocol.

A dither control signal is then sequentially introduced into the optical signal at various points along the optical path. By monitoring the error rate of the optical signal at the egress point of the optical network, the occurrence and/or location of a fault may be isolated within the optical network. When a forward error correction scheme is employed, it is envisioned that the number of corrected errors in the optical signal may alternatively be measured and monitored in order to isolate a fault with the optical network.

Specifically, the dither control signal is first introduced into a first signal channel, $\lambda_1$, at the transmitter 12. If there is not a fault in the first network section 32, then the error introduced into the signal channel is "cleaned up" by the first optical regenerator. As a result, the error rate of the optical signal measured at the egress point will be on the same order as the baseline error rate, thereby indicating that a fault does not exist in the first network section 32. Conversely, if there is a fault in the first network section 32, then the error is exaggerated by the fault before it reaches the first optical regenerator. As a result, the error rate of the optical signal measured at the egress point exhibits a meaningful deviation from the baseline error rate, thereby indicating that a fault does exist in the first network section 32.

Likewise, a dither control signal may be sequentially introduced into a first signal channel, $\lambda_1$, at each of the optical regenerators. By monitoring the error rate of the optical signal in a similar manner, a fault occurring in the second network section 34 and/or third network section 36 may also be identified in the optical network. It is envisioned that dither control signals may be introduced at other applicable optical devices in the optical network path. While the above description has been provided with reference to one signal channel, $\lambda_1$, it is readily understood that the process may be repeated for each of the signal channels embodied in the optical signal.

Figure 2:
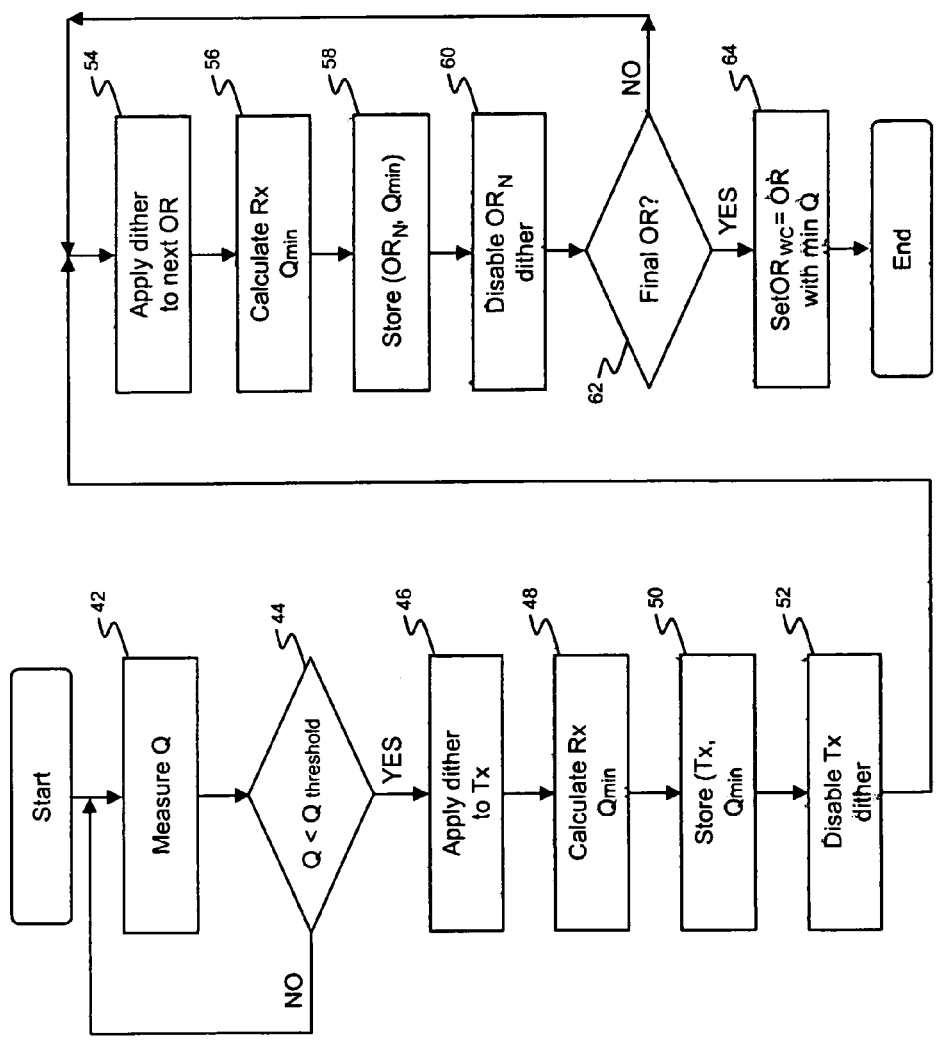
FIG. 2 is a flowchart illustrating a preferred embodiment of the methodology for isolating faults in an optical network having a plurality of partial regenerators in accordance with the present invention.

A preferred implementation of this methodology is provided in FIG. 2. An error rate is periodically measured for the optical signal traversing the optical network as shown at 42. Specifically, the error rate is expressed as Q, where Q is related to the bit error rate (BER) as is well known in the art. The measured Q serves as a baseline value for subsequent processing. When employing a forward error correction scheme, Q can be calculated from the corrected error rate. It is envisioned that other metrics may be used to provide an indication of the error rate of the optical signal.

The measured Q is then compared at step 44 with a predetermined threshold error rate, $Q_{threshold}$, that is indicative of a fault in the optical network. When the measured error rate is less than or equal to the predetermined threshold error rate, then there are no apparent faults in the network and processing returns to the start of the methodology. Conversely, when the measured error rate exceeds the predetermined threshold error rate, then processing continues.

Next, a dither control signal is applied to the optical signal at the transmitter as shown at step 46. An error rate for the optical signal is measured 48 at the egress point of the optical network, and then stored 50 in a data storage device. The error rate value is preferably stored in conjunction with an indicator of where the dither control signal is being is applied in the optical network. Once the error rate has been measured, the dither control signal is no longer applied to the optical signal at the transmitter as shown at step 52. Techniques for introducing a dither control signal into an optical signal at a transmitter are readily known to one skilled in the art.

The dither control signal is then sequentially introduced at a first partial regenerator located downstream from the transmitter in the optical path as shown at step 54. An error rate for the optical signal is measured 56 at the egress point of the optical path, and then stored 58 in the data storage device. As noted above, the error rate value is stored in conjunction with an indicator of the partial regenerator where the dither control signal was introduced into the optical network. Once the error rate has been determined, the dither control signal is no longer applied to the optical signal at that particular partial regenerator as shown at step 60. The above described process is repeated at step 62 for each of the partial regenerators residing in the optical path.

After a dither control signal has been sequentially introduced at each of the partial regenerators, the stored error rate data may be evaluated at step 64 against the baseline error rate value. In this exemplary embodiment, a fault is deemed to exist in the network section located downstream from the optical device exhibiting the largest stored error rate value. More specifically, the fault occurs on the network section between such optical device and the next partial regenerator residing in the optical path. However, it is readily understood that other more sophisticated assessment techniques may also be applied to the stored error rate data, thereby yielding additional fault isolation information for the optical network.

Figure 3:
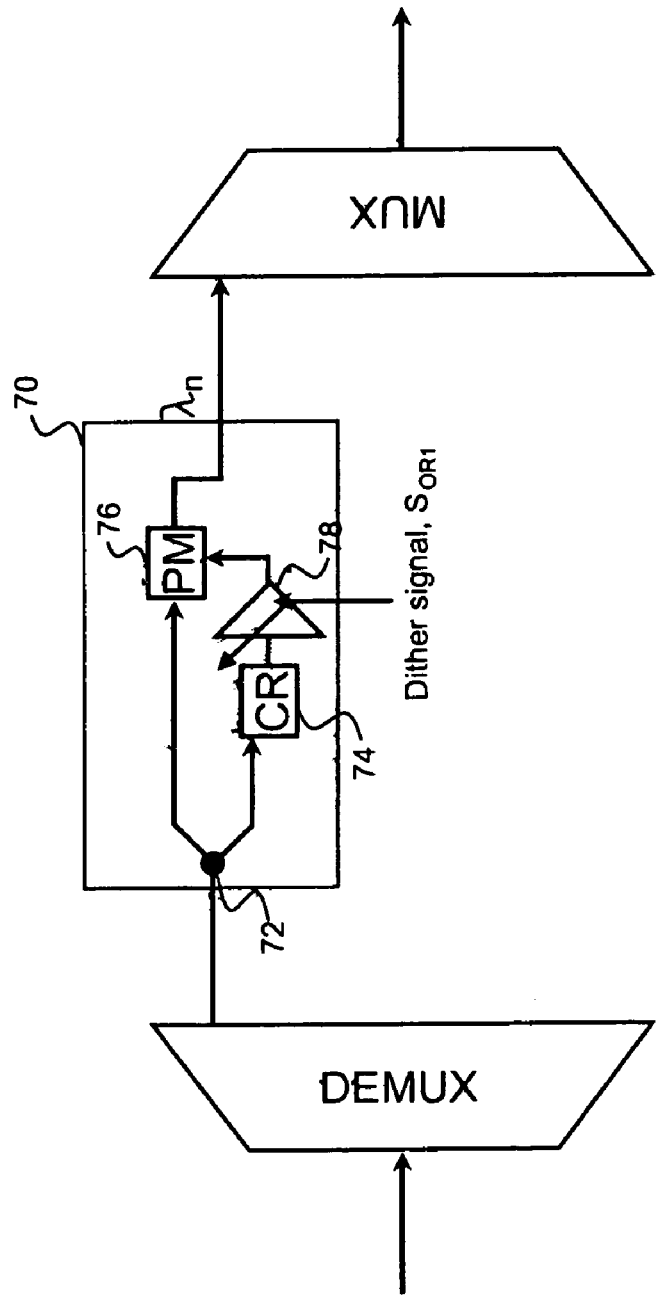
FIGS. 3 and 4 are block diagrams illustrating how a dither control signal may be introduced into an exemplary optical regenerator in accordance with the present invention.
Figure 4:
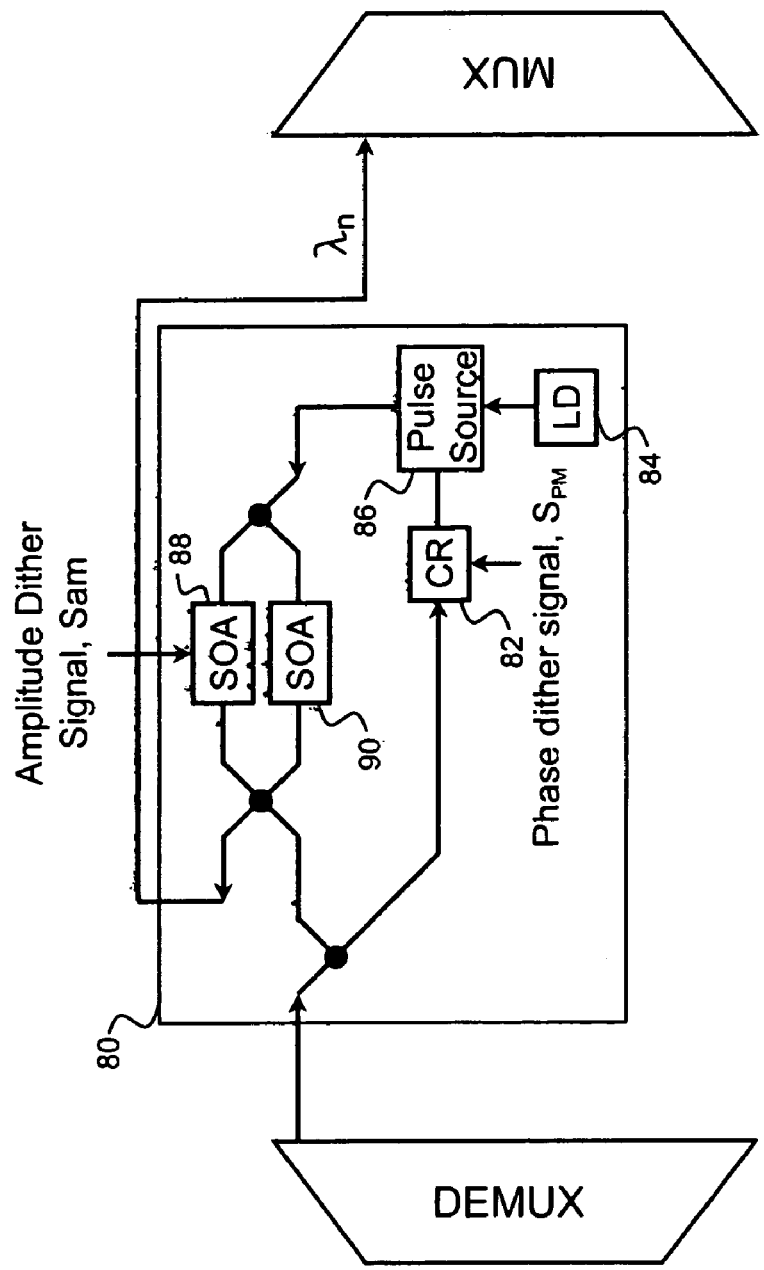

FIGS. 3 and 4 illustrate how a dither control signal may be introduced into exemplary optical regenerators. In FIG. 3, a first exemplary optical regenerator 70 includes a splitter 72, a clock recovery unit 74, a phase modulator 76, and a variable gain amplifier 78. One skilled in the art will readily recognize that a dither control signal may be introduced into the signal channel by slightly varying the gain of the amplifier, thereby varying the amplitude of the signal channel. This embodiment represents a synchronized phase modulator or soliton controller type of partial regenerator.

In FIG. 4, a second exemplary optical regenerator 80 includes a clock recovery unit 82, a laser diode 84, a pulse source 86, and two semiconductor optical amplifiers 88 and 90. These optical components are interconnected by various signal splitters and couplers in a configuration well known in the art. In this example, a dither control signal may be introduced into the signal channel by slightly varying the gain of one of the amplifiers, thereby varying the amplitude of the signal channel. Alternatively, a dither control signal may be introduced into the signal channel at the clock recovery unit 82. In this case, the phase of the signal channel may be varied as is well known in the art.

While the invention has been described in its presently preferred form, it will be understood that the invention is capable of modification without departing from the spirit of the invention as set forth in the appended claims.

What is claimed is:

1. A method for isolating faults in an optical path of an optical network having a plurality of partial regenerators, comprising:

transmitting an optical signal through the optical network, the optical signal having error detection data embedded therein;

determining an error rate for the optical signal at an egress point of the optical network, where the error rate is based on the error detection data embedded in the optical signal;

dithering the optical signal distinctly at two or more of the plurality of partial regenerators subsequent to determining an error rate at an egress point, where the optical signal is dithered by varying an amplitude of the optical signal using the partial regenerators; and monitoring the error rate for the dithered optical signal at the egress point of the optical network in order to isolate where a fault occurs in the optical network.

2. The method of claim 1 wherein the step of transmitting an optical signal further comprises embedding error detection data in B1 byte of a data frame in accordance with SONET protocol.

3. The method of claim 1 wherein the step of determining an error rate further comprises calculating Q for the optical signal at the egress point of the optical network.

4. The method of claim 1 wherein the step of determining an error rate further comprises deriving the error rate from the number of corrected errors in a forward error correction scheme.

5. The method of claim 1 further comprises dithering the optical signal at a transmitter subsequent to determining an error rate at an egress point and prior to dithering the optical signal distinctly at two or more of the plurality of partial regenerators, thereby assessing if a fault exists downstream from the transmitter.

6. The method of claim 1 wherein the step of dithering the optical signal distinctly at two or more of the plurality of partial regenerators further comprises distinctly dithering the optical signal at each of said plurality of partial regenerators, thereby assessing if a fault exists downstream from a given partial regenerator.

7. The method of claim 1 wherein the steps of dithering the optical signal distinctly at two or more of the plurality of partial regenerators and monitoring the error rate for the optical signal are performed only when the error rate for the optical signal exceeds a predetermined threshold error rate indicative of a fault in the optical network.

8. A method for isolating faults in an optical path of an optical network having a plurality of partial regenerators, comprising:
   transmitting an optical signal through the optical network;
   determining a baseline error rate for the optical signal at an egress point of the optical network;
   dithering the optical signal by varying an amplitude of the optical signal using a first partial regenerator after determining a baseline error rate;
   determining a first error rate for the dithered optical signal at the egress point of the optical network; and
   evaluating the first error rate in relation to the baseline error rate to assess if a fault exists downstream from the first partial regenerator.

9. The method of claim 8 further comprising the steps of:
   dithering the optical signal at a transmitter residing in the optical path after determining a baseline error rate and prior to dithering the optical signal using the first partial regenerator;
   determining a second error rate for the optical signal at the egress point of the optical network after dithering the optical signal at the transmitter and prior to dithering the optical signal using the first partial regenerator; and
   evaluating the second error rate in relation to the baseline error rate, thereby assessing if a fault exists downstream from the transmitter.

10. The method of claim 8 further comprises the steps of:
   (a) dithering the optical signal by varying the amplitude of the optical signal using a second partial regenerator located downstream from the first partial regenerator and after determining a first error rate;
   (b) determining a second error rate for the optical signal at the egress point of the optical network after dithering the optical signal at the second partial regenerator; and
   (c) evaluating the second error rate in relation to the baseline error rate to assess if a fault exists downstream from the second partial regenerator.

11. The method of claim 10 further comprises repeating steps (a) thru (c) for each of said plurality of partial regenerators in the optical network.

12. The method of claim 10 further comprises discontinuing dithering the optical signal using the first partial regenerator prior to dithering the optical signal using the second partial regenerator.

* * * * *